United States Patent
Vincent et al.

(10) Patent No.: US 7,197,533 B2
(45) Date of Patent: Mar. 27, 2007

(54) NON-PERSISTENT SERVICE SUPPORT IN TRANSACTIONAL APPLICATION SUPPORT ENVIRONMENTS

(75) Inventors: Christopher R. Vincent, Arlington, MA (US); Matthew N. Roy, Norwood, MA (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 10/350,672

(22) Filed: Jan. 24, 2003

(65) Prior Publication Data

US 2004/0177111 A1    Sep. 9, 2004

(51) Int. Cl.
  *G06F 15/16* (2006.01)
  *G06F 15/173* (2006.01)
  *G06Q 99/00* (2006.01)
(52) U.S. Cl. .................. 709/203; 709/223; 705/64
(58) Field of Classification Search ............... None
  See application file for complete search history.

(56) References Cited

U.S. PATENT DOCUMENTS 6,063,128 A   5/2000  Bentley et al.

2002/0072980 A1   6/2002  Dutta
2005/0216421 A1*  9/2005  Barry et al. ............. 705/64
2006/0059253 A1*  3/2006  Goodman et al. ........ 709/223

FOREIGN PATENT DOCUMENTS

EP          1 209 849 A2    5/2002

* cited by examiner

*Primary Examiner*—Wen-Tai Lin
(74) *Attorney, Agent, or Firm*—John E. Campbell; Stephen Bongini; Fleit, Kain, Gibbons, Gutman, Bongini & Bianco P.L.

(57) ABSTRACT

A system, method and computer-readable medium are disclosed for providing support for a non-persistent service. According to a preferred method, a request for a transaction associated with a non-persistent service is received. It is determined whether the transaction can be executed, and a message associated with the request is placed in a queue. If the transaction can be executed, the message is sent to the non-persistent service and removed the message from the queue. Preferably, if the transaction cannot be executed, the message is removed from the queue without being sent to the non-persistent service. Also provided is a web application server that includes a queue for storing a message associated with a request for a transaction associated with a non-persistent service, and an interface for sending the message to the non-persistent service if the web application server can execute the transaction.

17 Claims, 8 Drawing Sheets

NON-PERSISTENT SERVICE SUPPORT IN TRANSACTIONAL APPLICATION SUPPORT ENVIRONMENTS

BACKGROUND OF THE INVENTION

1. Field of the Invention

The present invention generally relates to the field of web application servers, and more specifically to the provision of support for non-persistent services by web application servers.

2. Description of Related Art

Web application servers are used for providing application services over the web. As the use of the web increases and entities such as companies, universities and small businesses are heading to the web in record numbers to establish a presence, the use of web application servers has also increased. The IBM WebSphere product is an example of a web application server system. IBM WebSphere utilizes the Java 2 Enterprise Edition (J2EE) web application server model—a standard web application server model. The J2EE application models adds transparent persistence and transactionality to the Java programming language. This means that transactions may be automatically undone, or rolled back, in the event of an application code error or server failure. For example, the web application server can be a bank application server that receives a withdrawal request. The bank application server may initiate the withdrawal transaction but encounter an application code error. In this case, the bank application server rolls back the withdrawal transaction by replacing the amount debited by the withdrawal request.

This "roll back" feature also applies to application code that invokes middleware services such as message queuing (e.g., IBM MQ), as long as the services also are persistent and provide support for transactions. However, the roll back feature does not apply to application code that invokes middleware services that are not persistent and do not provide support for transactions. For example, most widely used instant messaging systems, such as America Online Instant Messenger and ICQ, are not persistent and do not provide support for transactions. These systems consist simply of a central middleware application server and instant messenger client programs on each client computer.

As a result of this limitation, currently available web application servers that support the instant messaging non-persistent services above do not adequately provide the roll back feature. That is, transactions may be rolled back at the web application server, but the roll back does not occur at the service (i.e., instant messaging program). Thus, the state of the web application server is inconsistent with the state of the non-persistent service. That is, the web application server believes that the transaction never took place (since it was rolled back) while the non-persistent service believes that the transaction has already occurred and remains as such. This is disadvantageous because it can lead to inconsistencies and errors between the web application server and the non-persistent service.

Therefore a need exists to overcome the problems as discussed above, and particularly for a web application server that can provide support for non-persistent services.

SUMMARY OF THE INVENTION

It is an object of the present invention to provide a method for providing support for a non-persistent service.

Another object of the present invention is to provide a web application server that provides support for a non-persistent service.

In an embodiment of the present invention, the method on a web application server includes receiving an asynchronous request for a transaction associated with a non-persistent service and processing the request to determine whether the web application server can execute the transaction. The method further includes creating a message associated with the request, the message for sending to a client module on the web application server for interacting with the non-persistent service. The method further includes placing the message in a queue for the client module and, if the web application server can execute the transaction, sending the message to the client module and removing the message from the queue.

One embodiment of the present invention provides a method for providing support for a non-persistent service. According to the method, a request for a transaction associated with a non-persistent service is received. It is determined whether the transaction can be executed, and a message associated with the request is placed in a queue. If the transaction can be executed, the message is sent to the non-persistent service and removed the message from the queue. In a preferred embodiment, if the transaction cannot be executed, the message is removed from the queue without being sent to the non-persistent service.

Another embodiment of the present invention provides a web application server that includes first and second interfaces, a processor, and a queue. The first interface receives a request for a transaction associated with a non-persistent service. The processor determines whether the web application server can execute the transaction, and the queue stores a message associated with the request. If the web application server can execute the transaction, the second interface sends the message to the non-persistent service and the message is removed from the queue. In one preferred embodiment, the non-persistent service runs on a middleware server.

Thus, preferred embodiments of the present invention advantageously facilitate the maintenance of consistent status information between a web application server and a non-persistent service. That is, a web application server and a non-persistent service can maintain identical information regarding the status of transactions handled by the web application server and the non-persistent service. This facilitates the execution of the non-persistent service as supported by the web application server. Further, preferred embodiments of the present invention advantageously allow for the asynchronous execution of a call associated with a new transaction. That is, a call can be made for a new transaction and the web application server is not required to wait until the corresponding application code returns successfully before proceeding. This is beneficial as it increases the efficiency of processing allocations on the web application server.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

DESCRIPTION OF PREFERRED EMBODIMENTS

I. Overview

The present invention, according to a preferred embodiment, provides an efficient and easy-to-implement method for providing support for a non-persistent service on a web application server.

Figure 1:
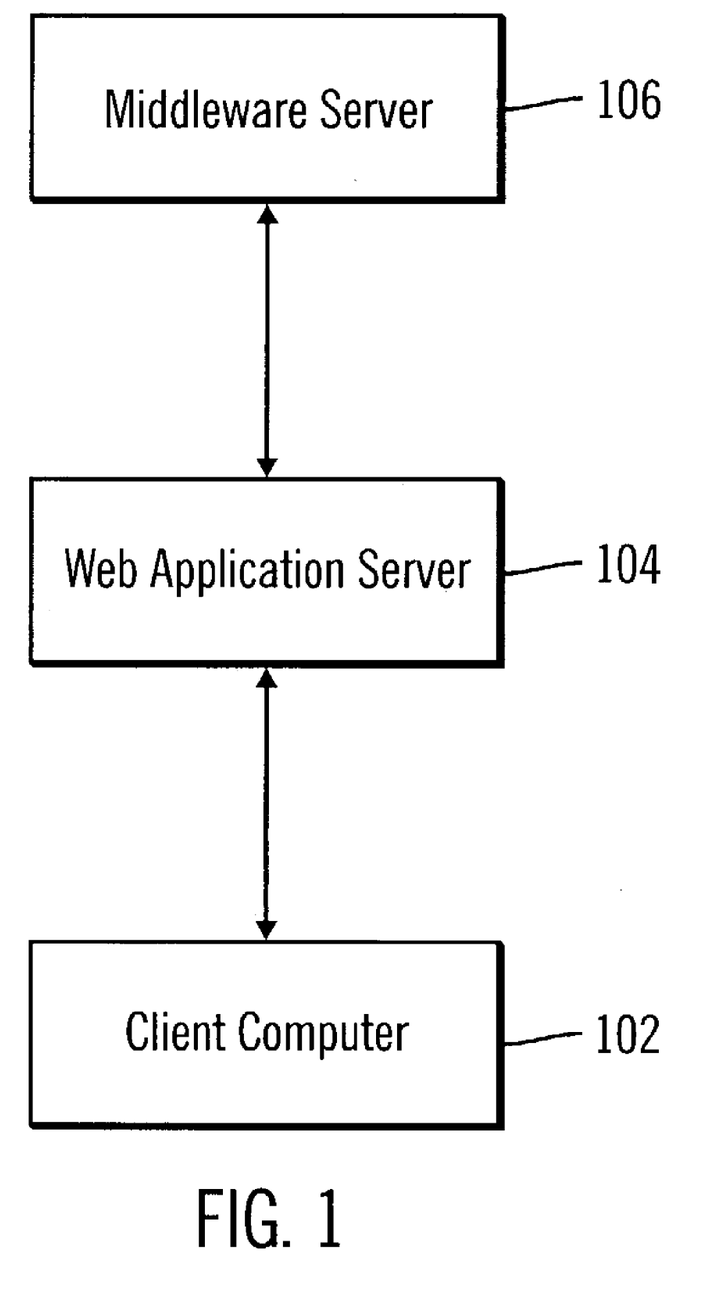
FIG. 1 is a block diagram illustrating the overall system architecture of one embodiment of the present invention.

FIG. 1 is a block diagram illustrating the overall system architecture of one embodiment of the present invention. The exemplary embodiments of the present invention described below adhere to the system architecture of FIG. 1. A user, operating on a client information processing system 102, or client computer, utilizes a client application, such as a web application server interface, on his client computer to interact with web application server 104. IBM WebSphere enterprise web application server is an example of a commercially available web application server.

The web application server 104 in turn interfaces with a middleware server 106. The middleware server 106 performs operations supporting a service that is performed via web application server 104. For example, middleware server 106 can be an instant messaging server that supports instant messaging operations for an instant messaging client on web application server 104. This example is explained in greater detail below.

In an embodiment of the present invention, the computer systems of user 102, web application server 104 and middleware server 106 are one or more Personal Computers (PCs) (e.g., IBM or compatible PC workstations running the Microsoft Windows operating system, Macintosh computers running the Mac OS operating system, or equivalent), Personal Digital Assistants (PDAs), game consoles or any other information processing devices. In another embodiment, the computer systems of user 102, web application server 104 and middleware server 106 are a server system (e.g., SUN Ultra workstations running the SunOS operating system or IBM RS/6000 workstations and servers running the AIX operating system).

In the embodiment of the present invention described above, the client computer system 102 of the user is separate from the computer system of web application server 104. In this embodiment, the user's computer 102 communicates with the computer system of web application server 104 over a network or other communication medium. In another embodiment of the present invention, the computer system 102 is a part of the computer system of web application server 104.

In yet another embodiment of the present invention, an optional network connects the computer 102 with the computer system of web application server 104 and the computer system of middleware server 106 with the computer system of web application server 104. In one embodiment, the network is a circuit switched network, such as the Public Service Telephone Network (PSTN). In another embodiment, the network is a packet switched network. The packet switched network is a wide area network (WAN), such as the global Internet, a private WAN, a local area network (LAN), a telecommunications network or any combination of the above-mentioned networks. In yet another embodiment, the network is a wired network, a wireless network, a broadcast network or a point-to-point network.

In an embodiment in which the computer system of web application server 104 is separate from the computer of user 102, certain tasks at the client computer 102 are performed by a client application, such as a Java applet, a Java scriptlet, Java script, Perl script, an Active X control or any self-sufficient application executing on the computer system 102. Further, certain tasks at the server system of web application server 104 are performed by a server application such as a Common Gateway Interface (CGI) script, a Java servlet, a Hypertext Preprocessor (PHP) script, a Perl script, Python or any self-sufficient application executing on the server system of web application server 104.

Figure 2:
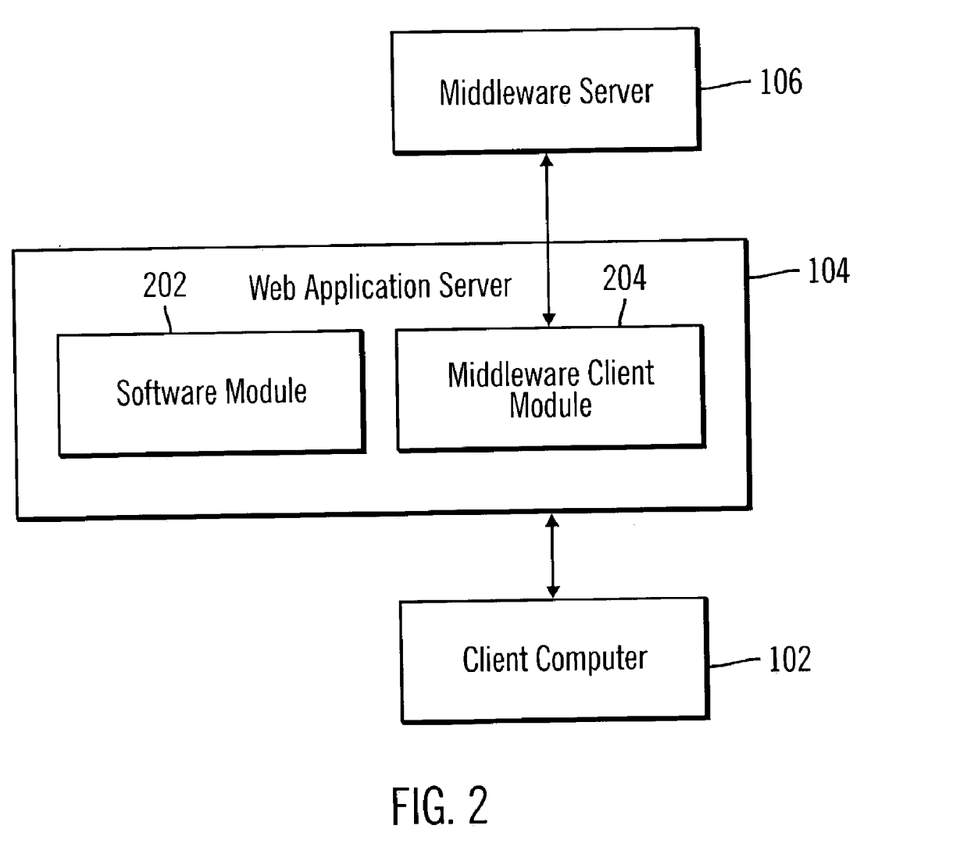
FIG. 2 is a block diagram providing more detail of a web application server of one embodiment of the present invention.

FIG. 2 is a block diagram providing more detail of a web application server of one embodiment of the present invention. FIG. 2 shows the client computer 102, the web application server 104 and the middleware server 106 of FIG. 1. FIG. 2 also shows that the application server 104 includes a software module 202 and a middleware client module 204. The middleware client module 204 is a local client program responsible for execution of middleware functions on the web application server 104. The middleware client module 204 also acts as a link between the web application server 104 and the middleware program, as served by the middleware server 106. The software module 202 in web application server 104 is a local program that initiates new transactions and runs the appropriate code necessary for execution of a new transaction on web application server 104. The code that is executed by the software module 202 is responsible for making a call on session, a local representation or a stub for the transaction that is being requested.

For example, assume that the web application server 104 is providing support for an instant messaging service provided by an instant messaging server at middleware server 106. In this example, the client computer 102 initiates a request on the web application server 104 to send an instant message to another user. Accordingly, the software module 202 receives the request and processes it. The software module 202 executes the appropriate code necessary for execution of the new transaction on the web application server 104. The application code makes a call on session, a local representation or a stub for the requested transaction, which is the transmission of an instant message. The application code necessary for execution of the new transaction on the web application server 104 executes and the middleware client module 204 initiates the appropriate actions for carrying out the new transaction. In this case, the middleware client module 204 sends out a network request for sending out an instant message.

Note that although only one middleware client module 204 is depicted in FIG. 2, the web application server 104 supports any number of middleware client modules for middleware programs. The aforementioned processes are described in greater detail below with reference to FIGS. 4–5.

II. Conventional Support for a Non-persistent Service

Figure 3A:
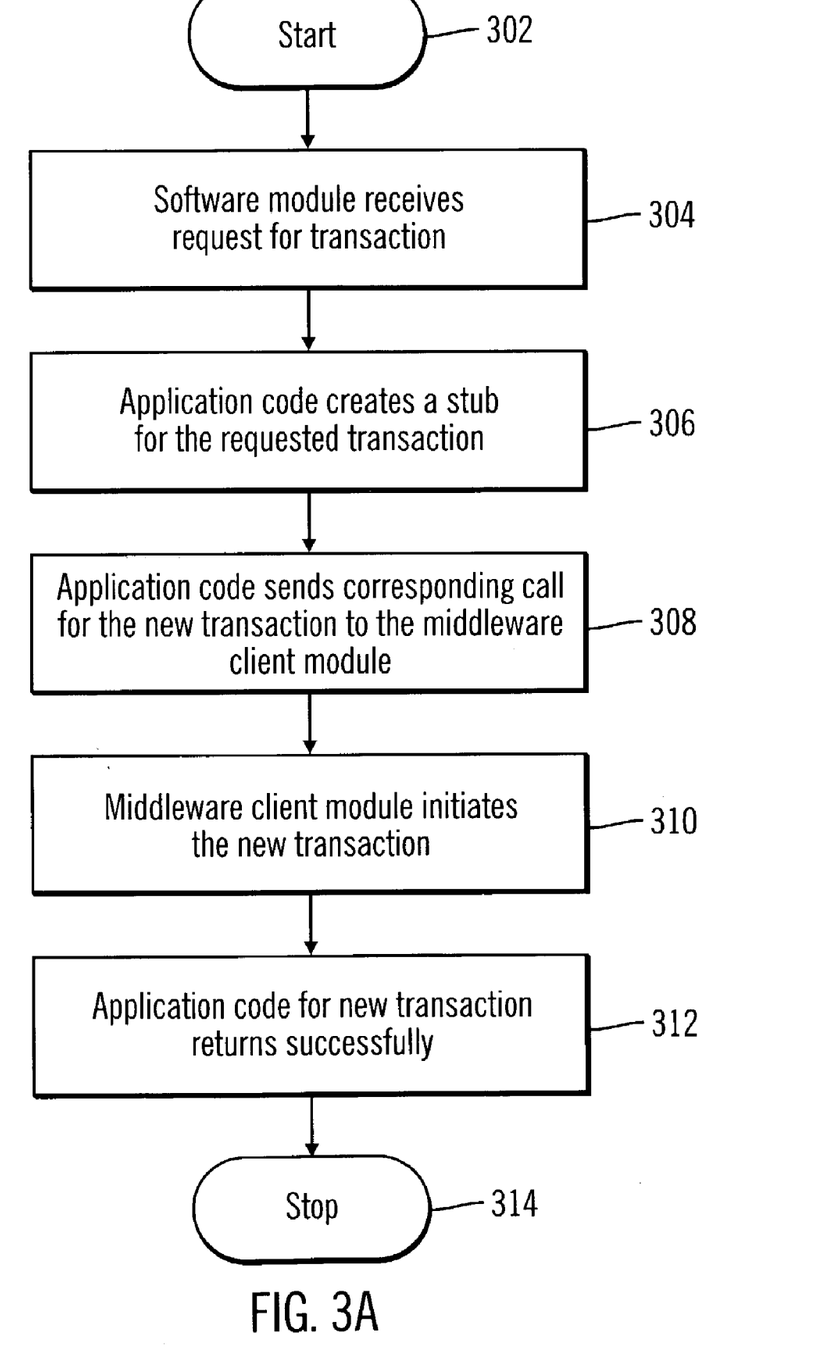
FIG. 3A is a flowchart depicting the operation and control flow of a conventional process for handling transactions from a non-persistent service.

FIG. 3A is a flowchart depicting the operation and control flow of a conventional process for handling transactions from a non-persistent service. Specifically, the flowchart of FIG. 3A shows a conventional process for providing support to a non-persistent service, when no error occurs during the execution of the application code and the transaction is fully completed. The flowchart of FIG. 3A should be viewed with reference to FIGS. 1 and 2, which describe in more detail the overall architecture of the system. In FIG. 3A, the exemplary non-persistent service depicted is an instant messaging service, as served by a middleware server 106.

The control flow of FIG. 3A begins with step 302 and flows directly to step 304. In step 304, a request for a transaction is received by the software module 202 from the client computer 102. For example, a user of client computer 102 initiates a request on the web application server 104 to send an instant message to another user. In step 304, the software module 202 receives the request and processes it. The software module 202 executes the appropriate code necessary for execution of the new transaction on the web application server 104. In step 306, the application code makes a call on session, a local representation or a stub for the requested transaction, which is the transmission of an instant message.

In step 308, the application code also sends a corresponding call for the new transaction to the middleware client module 204. As a result, in step 310, the middleware client module 204 initiates the appropriate actions for carrying out the new transaction. In this case, the middleware client module 204 sends out a network request for transmitting an instant message. Thus, as a result of step 310, the state of the non-persistent service (i.e., middleware server 106 in conjunction with middleware client module 204) reflects the completion of the new transaction. In this case, the instant messaging service believes that the instant message was sent out from the user of client computer 102 to its recipient.

In step 312, the execution of the application code for the new transaction returns successfully. Thus, as a result of step 312, the current state of the web application server 104 reflects the completion of the new transaction. In this case, the web application server 104 also believes that the instant message was sent out from the user of client computer 102 to its recipient. In step 314, the control flow of FIG. 3A ceases.

It should be noted that upon completion of the control flow of FIG. 3A, the state of the web application server 104 is consistent with the state of the non-persistent service. That is, both the web application server 104 and the non-persistent service believe that the new transaction completed successfully. More specifically, both the web application server 104 and the middleware client module 204 believe that the instant message of the user of client computer 102 was sent to its recipient.

Figure 3B:
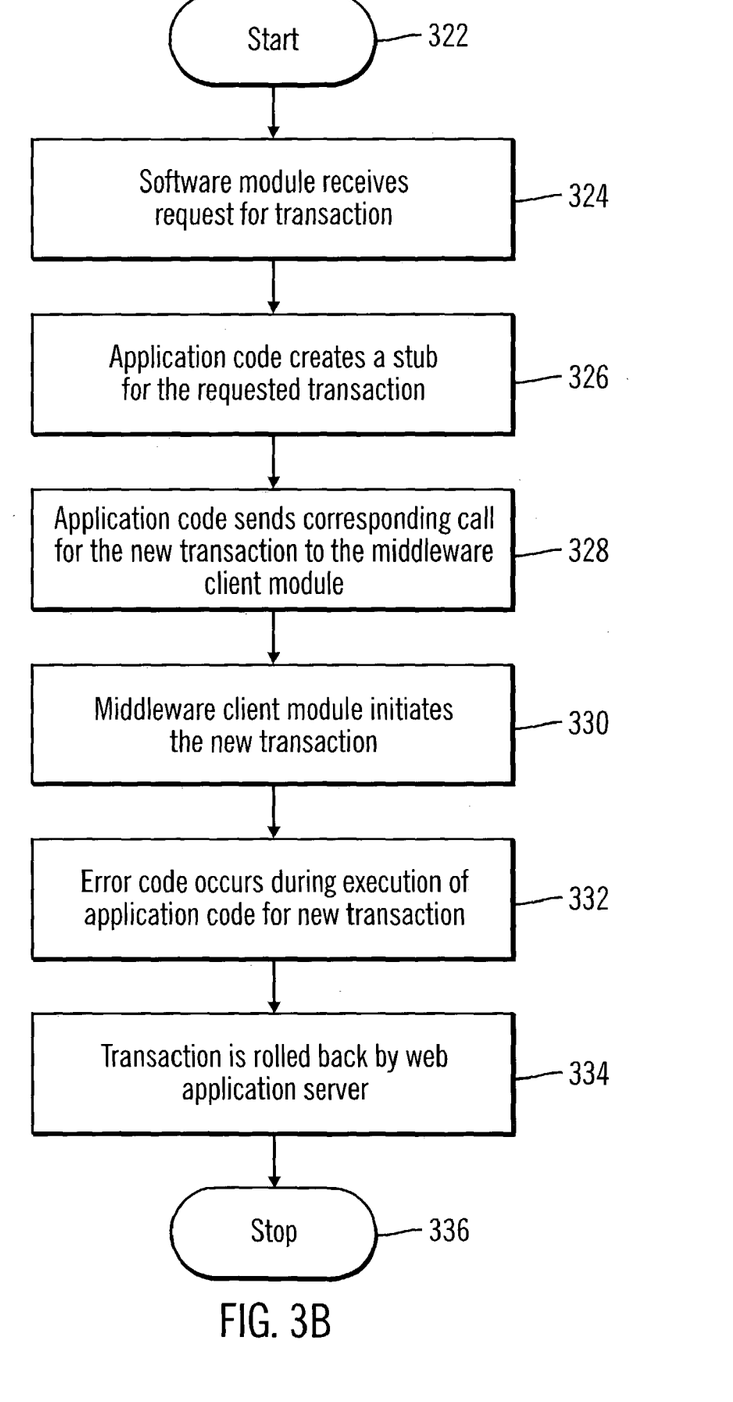
FIG. 3B is a flowchart depicting the operation and control flow of the conventional process with error handling.

FIG. 3B is a flowchart depicting the operation and control flow of the conventional process for handling transactions from a non-persistent service with error handling. Specifically, the flowchart of FIG. 3B shows a conventional process for providing support to a non-persistent service, when an error occurs during the execution of the application code.

The flowchart of FIG. 3B should be viewed with reference to FIGS. 1 and 2, which describe in more detail the overall architecture of the system. In FIG. 3B, the exemplary non-persistent service depicted is an instant messaging service, as served by a middleware server 106.

The control flow of FIG. 3B begins with step 322 and flows directly to step 324. In step 324, a request for a transaction is received by the software module 202 from the client computer 102. For example, a user of client computer 102 initiates a request on the web application server 104 to send an instant message to another user. In step 324, the software module 202 receives the request and processes it. The software module 202 executes the appropriate code necessary for execution of the new transaction on the web application server 104. In step 326, the application code makes a call on session, a local representation or a stub for the requested transaction, which is the transmission of an instant message.

In step 328, the application code also sends a corresponding call for the new transaction to the middleware client module 204. As a result, in step 330, the middleware client module 204 initiates the appropriate actions for carrying out the new transaction. In this case, the middleware client module 204 sends out a network request for sending out an instant message. Thus, as a result of step 330, the state of the non-persistent service (i.e., middleware server 106 in conjunction with middleware client module 204) reflects the completion of the new transaction. In this case, the instant messaging service believes that the instant message was sent out from the user of client computer 102 to its recipient.

In step 332, an error condition occurs during the execution of the application code for the new transaction, which causes the new transaction to be rolled back by the web application server 104 in step 334. Thus, as a result of step 334, the current state of the web application server 104 does not reflect the completion of the new transaction. In this case, the web application server 104 believes that the instant message was not sent from the user of client computer 102 to its recipient. In step 336, the control flow of FIG. 3B ceases.

It should be noted that although the new transaction is rolled back by the web application server 104, the non-persistent service (in this case, an instant messaging service) does not allow for rolling back of a transaction. By definition, a non-persistent service cannot support the roll back feature. Thus, the state of the web application server 104 is inconsistent with the state of the non-persistent service. That is, the web application server 104 believes that the transaction never took place (since it was rolled back) while the non-persistent service believes that the transaction has successfully occurred. More specifically, the middleware client module 204 believes that the instant message of the user 102 was sent to its recipient. However, the web application server 104 believes that the message was never sent (since it was rolled back). This can obviously lead to problems with instant messaging communications.

Figure 4A:
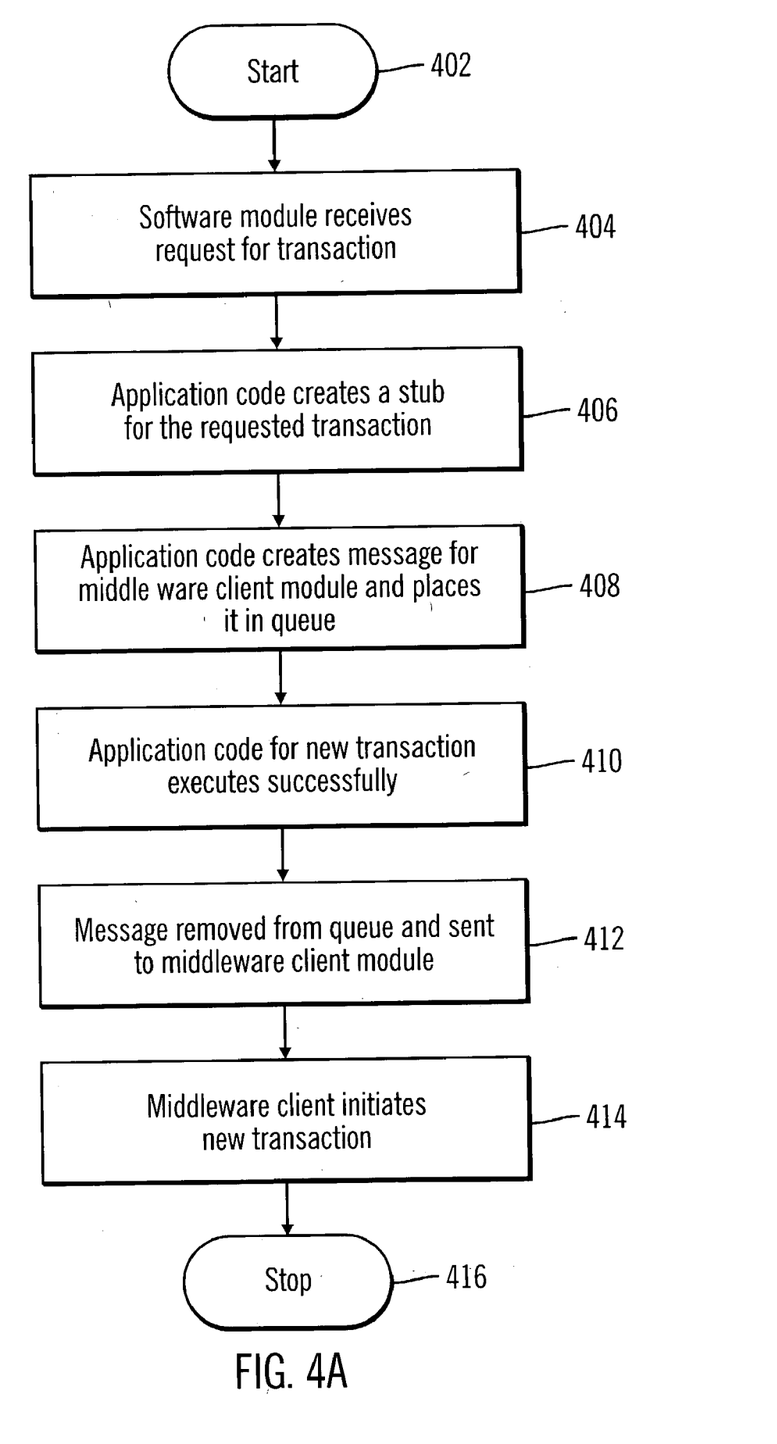
FIG. 4A is a flowchart depicting the operation and control flow of a transaction-handling process of a preferred embodiment of the present invention.

III. Support for a Non-persistent Service in Accordance with a Preferred Embodiment of the Present Invention FIG. 4A is a flowchart depicting the operation and control flow of a transaction-handling process of a preferred embodiment of the present invention. Specifically, the flowchart of FIG. 4A shows a transaction-handling process for providing support to a non-persistent service, when no error occurs during the execution of the application code and the transaction is fully completed. The flowchart of FIG. 4A should be viewed with reference to FIGS. 1 and 2, which describe in more detail the overall architecture of the system. In FIG. 4A, the exemplary non-persistent service depicted is an instant messaging service, as served by a middleware server 106.

The control flow of FIG. 4A begins with step 402 and flows directly to step 404. In step 404, a request for a transaction is received by the software module 202 from the client computer 102. For example, a user of client computer 102 initiates a request on the web application server 104 to send an instant message to another user. In step 404, the software module 202 receives the request and processes it. The software module 202 executes the appropriate code necessary for execution of the new transaction on the web application server 104. In step 406, the application code makes a call on session, a local representation or a stub for the requested transaction, which is the transmission of an instant message.

Figure 5:
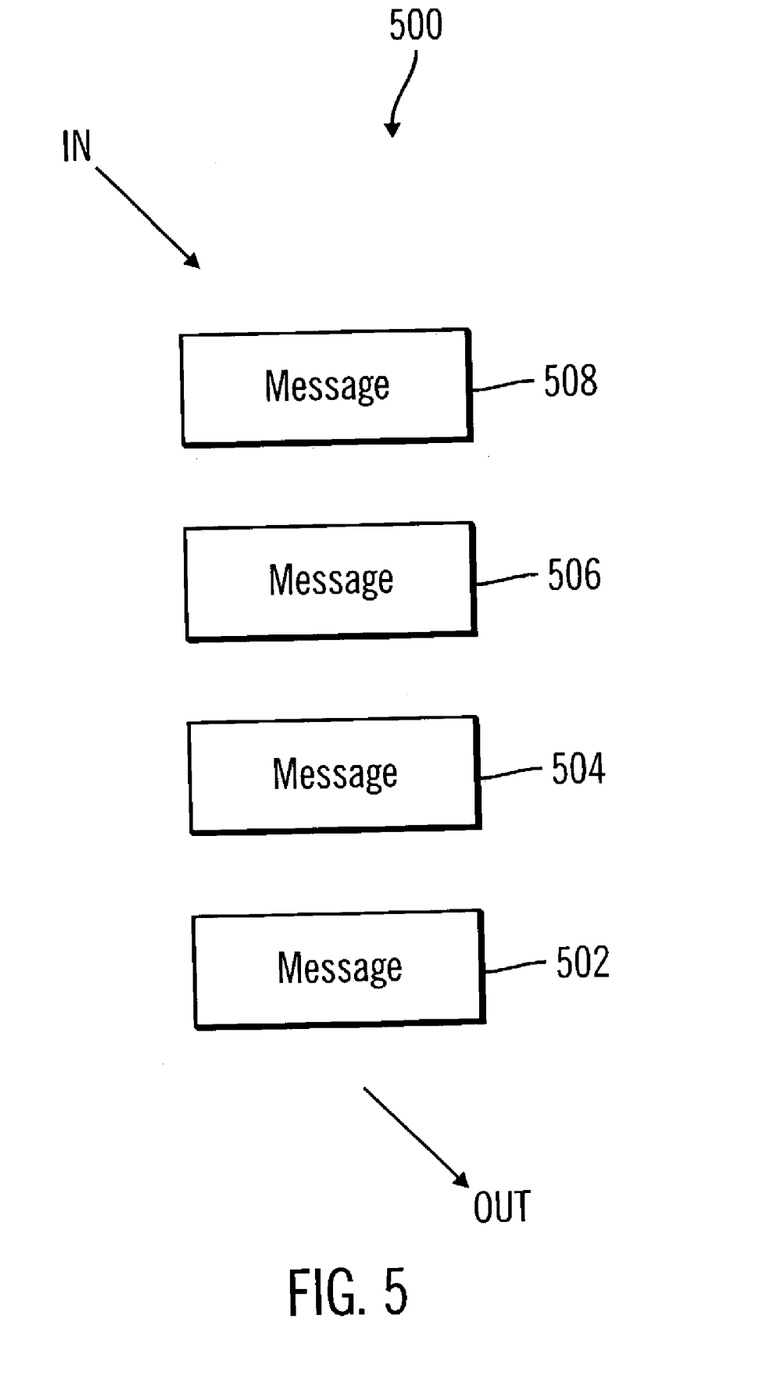
FIG. 5 is an illustration of a first-in, first-out message queue of one embodiment of the present invention.

In step 408, the application code creates a message, corresponding to the new transaction, and places it in a queue for middleware client module 204 (the queue is described in greater detail below with reference to FIG. 5). This message remains in the queue until a confirmation is received confirming that the application code necessary for execution of the new transaction on the web application server 104 has executed successfully. Until such a confirmation is received, the state of the non-persistent service (i.e., middleware server 106 in conjunction with middleware client module 204) does not reflect the completion of the new transaction. In this case, the instant messaging service does not believe that the instant message was sent out from the user of client computer 102 to its recipient until after the confirmation is received confirming that the application code has executed successfully (see steps 410–414 below).

In step 410, the application code necessary for execution of the new transaction on the web application server 104 executes successfully and returns. Thus, as a result of step 410, the current state of the web application server 104 reflects the completion of the new transaction. In this case, the web application server 104 believes that the instant message was sent out from the user of client computer 102 to its recipient.

In step 412, the message in the queue is removed from the queue and sent to the middleware client module 204. In step 414, the middleware client module 204 initiates the appropriate actions for carrying out the new transaction. In this case, the middleware client module 204 sends out a network request for sending out an instant message. Thus, as a result of step 412, the state of the non-persistent service reflects the completion of the new transaction. In this case, the instant messaging service believes that the instant message was sent out from the user of client computer 102 to its recipient. In step 416, the control flow of FIG. 4A ceases.

It should be noted that upon completion of the control flow of FIG. 4A, the state of the web application server 104 is consistent with the state of the non-persistent service. That is, both the web application server 104 and the non-persistent service believe that the new transaction completed successfully. More specifically, both the web application server 104 and the middleware client module 204 believe that the instant message of the user of client computer 102 was sent to its recipient.

This embodiment of the present invention is advantageous because it facilitates the maintenance of consistent status information between the web application server 104 and the non-persistent service. Both the web application server 104 and the non-persistent service believe that the transaction was completed because the middleware client module 204 sent out a network request for the transaction. This facilitates instant messaging communications as supported by a web application server. Further, this embodiment of the present invention is advantageous because it allows for the asynchronous execution of a call to the software module 202. That is, a call can be made to the software module 202, which in turn executes corresponding application code, and the web application server 104 is not required to wait until the application code returns successfully before proceeding. This is beneficial as it increases the efficiency of processing allocations on the web application server 104.

Figure 4B:
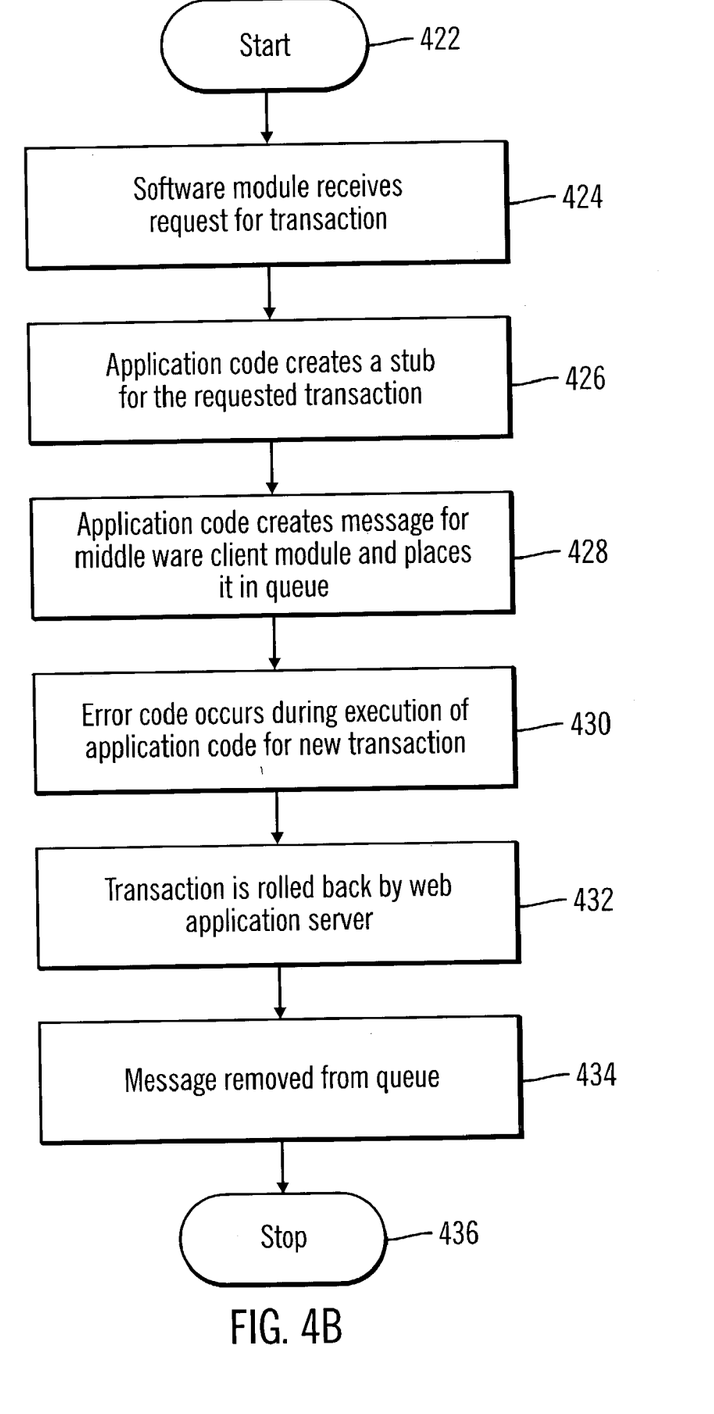
FIG. 4B is a flowchart depicting the operation and control flow of the transaction-handling process of the preferred embodiment with error handling.

FIG. 4B is a flowchart depicting the operation and control flow of the transaction-handling process of the preferred embodiment with error handling. Specifically, the flowchart of FIG. 4B shows a transaction-handling process for providing support to a non-persistent service when an error occurs during the execution of the application code. The flowchart of FIG. 4B should be viewed with reference to FIGS. 1 and 2, which describe in more detail the overall architecture of the system. In FIG. 4B, the exemplary non-persistent service depicted is an instant messaging service, as served by a middleware server 106.

The control flow of FIG. 4B begins with step 422 and flows directly to step 424. In step 424, a request for a transaction is received by the software module 202 from the client computer 102. For example, a user of client computer 102 initiates a request on the web application server 104 to send an instant message to another user. In step 424, the software module 202 receives the request and processes it. The software module 202 executes the appropriate code necessary for execution of the new transaction on the web application server 104. In step 426, the application code makes a call on session, a local representation or stub for the requested transaction, which is the transmission of an instant message.

In step 428, the application code creates a message, corresponding to the new transaction, and places it in a queue for middleware client module 204. This message remains in the queue until a confirmation is received confirming that the application code necessary for execution of the new transaction on the web application server 104 has executed successfully. Until such a confirmation is received, the state of the non-persistent service does not reflect the completion of the new transaction. In this case, the instant messaging service does not believe that the instant message was sent out from the user of client computer 102 to its recipient until after the confirmation is received confirming that the application code has executed successfully.

In step 430, an error condition occurs during the execution of the application code for the new transaction, which causes the new transaction to be rolled back by the web application server 104 in step 432. Thus, the application code necessary for execution of the new transaction on the web application server 104 does not execute successfully. As a result of steps 430 and 432, the current state of the web application server 104 does not reflect the completion of the new transaction. In this case, the web application server 104 believes that the instant message was not sent from the user of client computer 102 to its recipient.

Subsequently, in step 434, the message in the queue is discarded from the queue and the middleware client module 204 is not notified. Middleware client module 204 does not initiate a new transaction because it does not receive the message requesting a new transaction. Therefore, because the middleware client module 204 never initiates a new transaction, the state of the non-persistent service (i.e., middleware server 106 in conjunction with middleware client module 204) does not reflect the completion of the new transaction. In this case, the instant messaging service believes that an instant message was never sent out from the user of client computer 102 to its recipient. In step 436, the control flow of FIG. 4B ceases.

It should be noted that upon completion of the control flow of FIG. 4B, the state of the web application server 104 is consistent with the state of the non-persistent service, even in light of the error that occurred during execution of the application code. That is, both the web application server 104 and the non-persistent service believe that the new transaction was not completed. More specifically, both the web application server 104 and the middleware client module 204 do not believe that the instant message of the user of client computer 102 was sent to its recipient.

This is in stark contrast to the control flow of FIG. 3B, which depicted the operation and control flow of a conventional process for handling transactions from a non-persistent service. In the conventional process of FIG. 3B, the state of the web application server 104 became inconsistent with the state of the non-persistent service because of the error that occurred during execution of the application code. The present invention maintains the state of the web application server 104 consistent with the state of the non-persistent service even when an error occurs during execution of the application code. This is a result of the use of the message queue in the preferred embodiment.

This embodiment of the present invention is advantageous because it facilitates the support of non-persistent services (such as instant messaging communications) by a web application server through the maintenance of consistent status information between the web application server 104 and the non-persistent service. Using the instant messaging service example above, both the middleware client module 204 and the web application server 104 believe that the message was never sent (because it was rolled back). Further, the above embodiment of the present invention is advantageous because it allows for the asynchronous execution of a call to the software module 202. That is, a call can be made to the software module 202, which in turn executes corresponding application code, and the web application server 104 is not required to wait until the application code returns successfully before proceeding. The use of the message queue allows the web application server 104 to make a call and proceed with normal operation. It is only after the application code returns from successful execution that the middleware client module 204 is notified of completion of the new transaction. This is beneficial as it increases the efficiency of processing allocations on the web application server 104.

IV. Message Queuing

As described above with reference to steps 408 and 428, a message queue is utilized in the preferred embodiment for sending transaction requests to the middleware client module 204. Specifically, when the application code for a transaction executes, it creates a message pertaining to the requested new transaction. This message is placed in a queue and held until the application code returns successfully. If the application code returns successfully, the message is forwarded to middleware client module 204 and the new transaction requested. If the application code does not return successfully, the message is discarded from the queue and the middleware client module 204 is not made aware of the new transaction.

A message queue is a structure for storing and managing messages, with messages typically being accepted and emitted based on predefined criteria. There are a variety of methods for implementing a message queue. One exemplary method for implementing a message queue is a first-in, first-out message queue in which messages in a queue are prioritized based on the time that each message entered the queue. This method is described in greater detail with reference to FIG. 5. FIG. 5 is an illustration of a first-in, first-out message queue 500 of one embodiment of the present invention. FIG. 5 shows a group of messages 502, 504, 506 and 508 in a queue 500. As messages enter the queue 500, they are placed on the top of the queue 500 and optionally time stamped so as to store the time when the message entered the queue 500. As such, the most recent messages are located at the top of queue 500 and the oldest messages are located at the bottom of the queue 500.

In a first-in, first-out message queue like queue 500, messages exit the queue based on time priority. That is, the messages exit the queue in the same chronological order as they are received. With reference to FIG. 5, the first message to exit the queue 500 is message 502 because it is the oldest message. Subsequently, the second message to exit the queue 500 is message 504 because it is the second oldest message. Message is 504 is followed by message 506 and then message 508.

In this manner, the message queue 500 can be utilized to manage the messages for new transaction requests intended for middleware client module 204. In the event that the application code does not execute successfully, as described in step 430, then the corresponding message is discarded from the queue 500, as described in step 434. In this case, each message that is more recent than the removed message is shifted down one place. For example, if message 504 were discarded from the queue 500, then message 506 would shift down to take the place of discarded message 504, and message 508 would shift down to take the place of shifted message 506.

Another exemplary method for implementing a message queue is a priority index message queue in which messages in a queue are prioritized based on a priority index that is assigned to each message. Yet another exemplary method for implementing a message queue is a variable priority message queue in which messages in a queue are prioritized based on varying criteria, such as the content of the message.

V. Exemplary Implementations

The present invention can be realized in hardware, software, or a combination of hardware and software in web application server 104 of FIG. 1. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product (in web application server 104), which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer-readable medium, allowing a computer system, to read data, instructions, messages or message packets, and other computer-readable information from the computer-readable medium. The computer-readable medium may include non-volatile memory, such as ROM, Flash memory, Disk drive memory, CD-ROM, and other permanent storage. Additionally, a computer-readable medium may include, for example, volatile storage such as RAM, buffers, cache memory, and network circuits. Furthermore, the computer-readable medium may comprise computer-readable information in a transitory state medium such as a network link and/or a network interface, including a wired network or a wireless network, that allow a computer system to read such computer-readable information.

Figure 6:
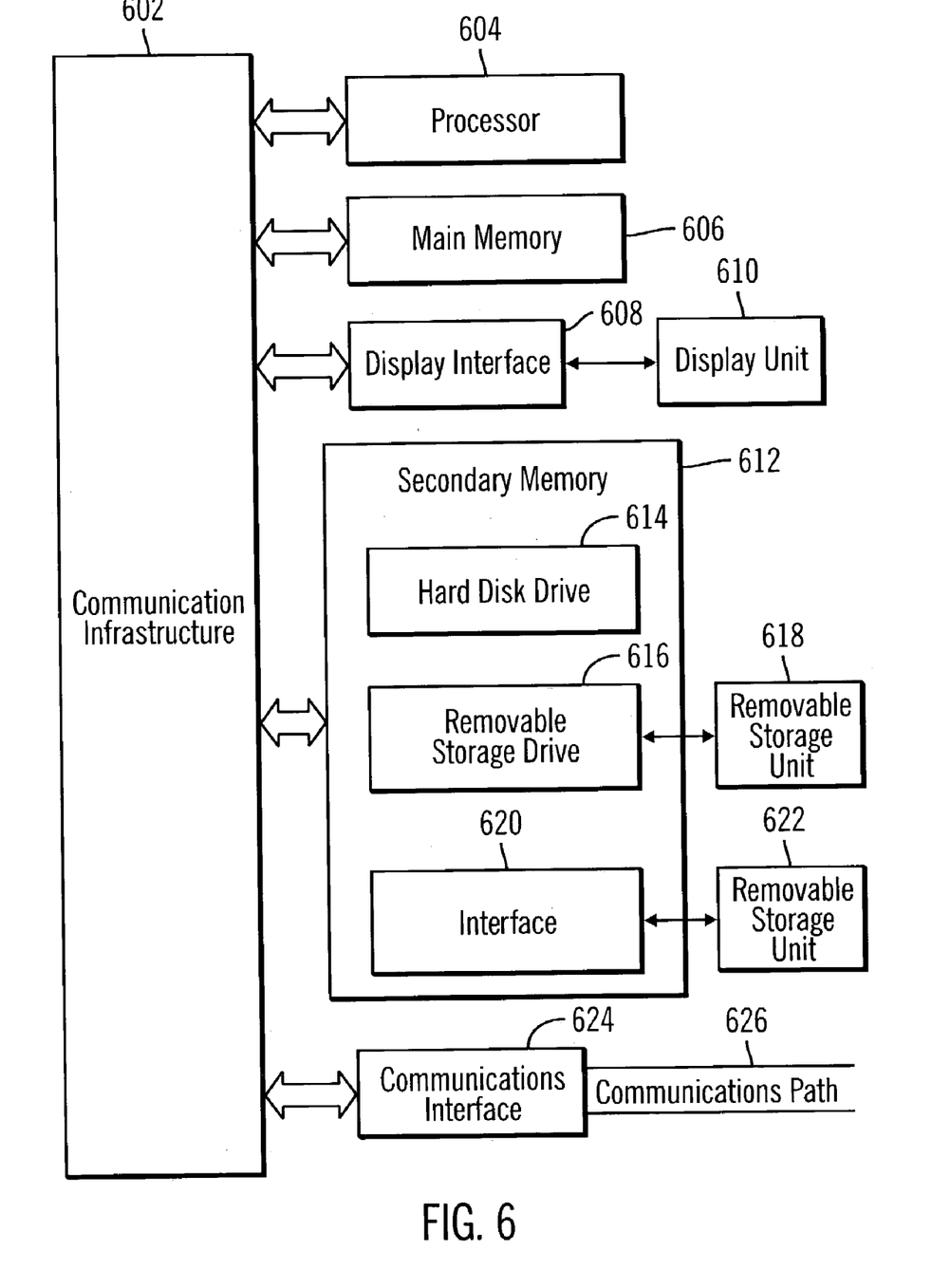
FIG. 6 is a block diagram of a computer system useful for implementing embodiments of the present invention.

FIG. 6 is a block diagram of a computer system useful for implementing an embodiment of the present invention. The computer system of FIG. 6 is a more detailed representation of the computer 101 or the computer system of database 103. The computer system of FIG. 6 includes one or more processors, such as processor 604. The processor 604 is connected to a communication infrastructure 602 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 608 that forwards graphics, text, and other data from the communication infrastructure 602 (or from a frame buffer not shown) for display on the display unit 610. The computer system also includes a main memory 606, preferably random access memory (RAM), and may also include a secondary memory 612. The secondary memory 612 may include, for example, a hard disk drive 614 and/or a removable storage drive 616, representing a floppy disk drive, a magnetic tape drive, an optical disk drive, etc. The removable storage drive 616 reads from and/or writes to a removable storage unit 618 in a manner well known to those having ordinary skill in the art. Removable storage unit 618, represents a floppy disk, magnetic tape, optical disk, etc. which is read by and written to by removable storage drive 616. As will be appreciated, the removable storage unit 618 includes a computer usable storage medium having stored therein computer software and/or data.

In alternative embodiments, the secondary memory 612 may include other similar means for allowing computer programs or other instructions to be loaded into the computer system. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to the computer system.

The computer system may also include a communications interface 624. Communications interface 624 allows software and data to be transferred between the computer system and external devices. Examples of communications interface 624 may include a modem, a network interface (such as an Ethernet card), a communications port, a PCM-CIA slot and card, etc. Software and data transferred via communications interface 624 are in the form of signals which may be, for example, electronic, electromagnetic, optical, or other signals capable of being received by communications interface 624. These signals are provided to communications interface 624 via a communications path (i.e., channel) 626. This channel 626 carries signals and may be implemented using wire or cable, fiber optics, a phone line, a cellular phone link, an RF link, and/or other communications channels.

In this document, the terms "computer program medium," "computer-usable medium," "machine-readable medium" and "computer-readable medium" are used to generally refer to media such as main memory 606 and secondary memory 612, removable storage drive 616, a hard disk installed in hard disk drive 614, and signals. These computer program products are means for providing software to the computer system. The computer-readable medium allows the computer system to read data, instructions, messages or message packets, and other computer-readable information from the computer-readable medium. The computer-readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer-readable medium may comprise computer-readable information in a transitory state medium such as a network link and/or a network interface, including a wired network or a wireless network, that allow a computer to read such computer-readable information.

Computer programs (also called computer control logic) are stored in main memory 606 and/or secondary memory 612. Computer programs may also be received via communications interface 624. Such computer programs, when executed, enable the computer system to perform the features of the present invention as discussed herein. In particular, the computer programs, when executed, enable the processor 604 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for providing support for a non-persistent service, said method comprising the steps of:
   receiving a request for a transaction associated with a non-persistent service;
   placing, in response to receiving the request, a message associated with the request in a queue;
   determining if a confirmation is received to confirm that a process associated with the transaction has executed successfully;
   if the confirmation was received, sending the message to the non-persistent service and removing the message from the queue; and
   if the confirmation was not received, removing the message from the queue without sending the message to the non-persistent service.

2. The method of claim 1, further comprising the steps of:
receiving the message at the non-persistent service; and
updating the status of the non-persistent service to reflect the execution of the transaction.

3. The method of claim 1, wherein the non-persistent service is an instant messaging service.

4. The method of claim 3, wherein the transaction is sending an instant message.

5. The method of claim 1, wherein the non-persistent service is a web service.

6. The method of claim 5, wherein the transaction is sending a request for information.

7. The method of claim 1, wherein the request for a transaction is an asynchronous request.

8. A computer program product for providing support for a non-persistent service, said computer program product comprising a storage medium readable by a processing circuit and storing computer instructions for performing the steps of:
receiving a request for a transaction associated with a non-persistent service;
placing, in response to receiving the request, a message associated with the request in a queue;
determining if a confirmation is received to confirm that a process associated with the transaction has executed successfully;
if the confirmation was received, sending the message to the non-persistent service and removing the message from the queue; and
if the confirmation was not received, removing the message from the queue without sending the message to the non-persistent service.

9. The computer program product of claim 8, wherein the program further contains instructions for performing the steps of:
receiving the message at the non-persistent service; and
updating the status of the non-persistent service to reflect the execution of the transaction.

10. The computer program product of claim 8, wherein the non-persistent service is an instant messaging service.

11. The computer program product of claim 8, wherein the non-persistent service is a web service.

12. The computer program product of claim 8, wherein the request for a transaction is an asynchronous request.

13. A web application server comprising:
a first interface for receiving a request for a transaction associated with a non-persistent service;
a processor for determining if a confirmation is received to confirm that a process associated with the transaction has executed successfully;
a queue for, in response to receiving the request, storing a message associated with the request; and
a second interface,
wherein if the confirmation was received, the processor removes the message from the queue and sends the message through the second interface to the non-persistent service, and
if the confirmation was not received, the processor removes the message from the queue without sending the message to the non-persistent service.

14. The web application server of claim 13, wherein the non-persistent service runs on a middleware server.

15. The web application server of claim 13, wherein a network interface functions as both the first interface and the second interface.

16. The web application server of claim 13, wherein the non-persistent service is an instant messaging service.

17. The web application server of claim 13, wherein the request for a transaction is an asynchronous request.

* * * * *